United States Patent [19]

Walter

[11] 4,084,443
[45] Apr. 18, 1978

[54] ACCELEROMETERS

[75] Inventor: Derek Oscar Walter, London, England

[73] Assignee: Johnson, Matthey & Co., Limited, London, England

[21] Appl. No.: 781,453

[22] Filed: Mar. 25, 1977

[30] Foreign Application Priority Data

Mar. 30, 1976  United Kingdom ............ 12748/76

[51] Int. Cl.² ........................................... G01P 15/08
[52] U.S. Cl. ............................................... 73/517 R
[58] Field of Search ............... 73/516 R, 517 R, 514, 73/654, 71.2; 310/15, 25; 340/195, 261, 262

[56] References Cited

U.S. PATENT DOCUMENTS 2,551,857   5/1951   Stanton .............................. 310/25
2,754,434   7/1956   Frank ............................... 73/71.2 X
2,979,959   4/1961   Clurman .......................... 73/516 R Primary Examiner—James J. Gill
Attorney, Agent, or Firm—Cushman, Darby & Cushman

[57] ABSTRACT

This invention relates to accelerometers, that is to devices for detecting or measuring accelerations. An accelerometer in accordance with this invention includes at least one body a support or support system for supporting the body in a state of stable equilibrium except when the accelerometer is subjected to an acceleration exceeding a threshold value wherein movement of the body relative to the support causes a change in a physical parameter of the accelerometer which is other than a dimensional change due to distortion and other than, or in addition to, a flow of electric current via the body from one part of the support to another.

5 Claims, 2 Drawing Figures

ACCELEROMETERS

This invention relates to accelerometers, that is, to devices for detecting or measuring accelerations.

More particularly, the invention is concerned with improvements in accelerometers of the type which include at least one body which rests in a condition of stable equilibrium on a support or support system within, or otherwise forming part of, the accelerometer, except when the accelerometer, and hence the support or support system is subjected to an acceleration exceeding a certain threshold value. Throughout the remainder of this specification, such an accelerometer will be referred to as "an accelerometer of the type described". The threshold value of acceleration of an accelerometer of the type described is characteristic of the particular combination of body and support or support system in question, and whenever this threshold value is exceeded, the equilibrium of the body is disturbed and the body moves in relation to the support or support system. The said "support or support system" will, throughout the remainder of this specification be referred to for convenience simply as the "support" and this word "support", is, as the context requires, to be taken as meaning either a single support or a system of supports.

The movement of the body in relation to the support is caused to produce a signal which, in simple forms of the accelerometer may simply indicate the occurrence of an acceleration greater than the threshold value. In more sophisticated forms of the accelerometer, however, the signal may be arranged to be at least indicative of the magnitude and possibly the direction of the acceleration.

In a known embodiment of an accelerometer of the type described, the body is a metal sphere and the support consists of three metal points, generally arranged at the corners of an equilateral triangle, upon which the sphere rests. The sphere is held in electrical contact with the points by its own weight, but it may, additionally, be held down on the points under the agency of a magnetic force by a magnet located between the points. In operation, electric currents are caused to flow from one of the points to the other two. The flow of current is continuously monitored and if the support is subjected to an acceleration which, for example, lies in a plane containing the three points and which is greater than the threshold value, electrical contact will be broken between at least one of the points and the surface of the sphere. The resulting interruption of the flow of current between the pair or or pairs of points shows immediately that an acceleration greater than the threshold value has occurred; the pair of points concerned will give at least an indication of the general direction of the acceleration and, from a knowledge of the mechanical characteristics of the ball and points system and of the period of interruption of current flow between a pair of points, it is possible to determine the magnitude and duration of the acceleration. Similarly, a knowledge of the periods of interruption of the current flow between any two pairs of points may help to determine with greater accuracy the direction of the acceleration in the plane containing the points.

A disadvantage of this type of accelerometer is that it is necessary for the sphere and contact points to be resistant to corrosion so that the electrical contact resistance between the sphere and the points will not change when the accelerometer is in service. This can be done by housing the sphere and contacts within a sealed container which is either evacuated or filled with an inert atmosphere or by coating the sphere and contacts with a corrosion resistant contact material, such as gold.

The first solution is inconvenient and expensive and makes access to the sphere and contacts for servicing difficult. The second solution, especially if gold is used as the contact material, often leads to the pressure welding together of the sphere and one or more of the contacts. This is particularly so if the accelerometer is left unused for long periods and leads to a loss of sensitivity of the device since an acceleration a good deal greater than the designed threshold value will in general be required to break the said welds.

It is an object of the present invention to provide an accelerometer in which the above disadvantages are avoided or at least considerably reduced.

According to one feature of the invention, an accelerometer of the type described is such that movement of the body in relation to the support (as hereinbefore defined) causes a change in a physical parameter of the accelerometer which is other than a dimensional change due to distortion and other than, or in addition to, a flow of electric current via the body from one part of the support to another, the body and support being preferably of such material or materials that they will not pressure weld together.

Preferably the physical parameter is the magnetic flux in a magnetic circuit which includes at least a part of the body and at least a part of the support.

Alternatively the physical parameter may be the capacitance between at least a part of the body and at least a part of the support.

According to one specific embodiment of the invention a first supporting member and the body are made from magnetic materials and the remaining supporting members are made from non-magnetic materials, the first supporting member having an extension which passes through and forms a core for a solenoid, a magnetic or magnetisable element attached to the core at a position remote from the body, the element having a pole piece which terminates at a surface confronting the body across a spacial gap such that the body, the first supporting member and its extension, the magnetic "magnetisable element, the pole piece and the spacial gap constitute a magnetic circuit having a substantially constant flux when the body is supported on the supports, and when the solenoid is energised, the flux changing when the accelerometer is subjected to an acceleration which dislodges the body from the supports to change the extent of the spacial gap and produce a further spacial gap between the body and the first supporting member.

According to another specific embodiment of the invention, the body is of generall mushroom shape having a head and a stem and the accelerator also comprises an annular permanent magnetic element or an annular magnetisable element, three substantially parallel and equally spaced core members carried by the said element and each having an associated solenoid, one end of each core constituting a support for the body so that when at rest, the stem is located in a space within the solenoids and passes with clearance through the said annular element, the head is supported on the three supports constituted by the ends of the cores, and undisturbed flux linkages exist in magnetic circuits between the individual solenoids, a portion of the said annular element a spacial gap between the annular element and the stem, the head and the appropriate core, the flux changing when the accelerometer is subjected to an acceleration which dislodges the head from at least one support to establish a space therebetween.

The invention will now be described by way of example with reference to the accompanying drawings, in which.

Figure 1:
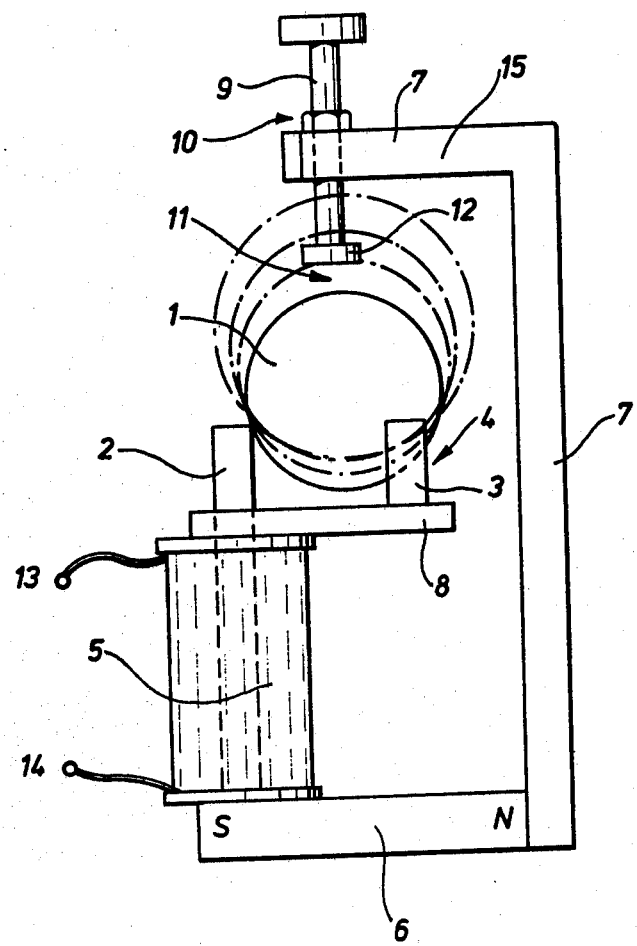
FIG. 1 is a side elevation of one embodiment of an accelerometer.

Referring to FIG. 1, a sphere 1 of iron or some other ferromagnetic material rests freely on posts 2, 3 and 4 (post 4 is not visible in the figure and is directly behind post 3) which are located at the corners of an equilateral triangle. Posts 3 and 4 are of non-magnetic material such as a hard copper alloy or plastics material and are secured to a non-magnetic circular base 8. Post 2 is an extension of a core of a solenoid 5 and is made of iron or some other ferromagnetic material. As shown, it passes through the base 8 and extends through the solenoid 5 down to a permanent magnet 6, to which it is secured. Finally, a cranked arm 7 of iron or some other ferromagnetic material carrying at its upper end an adjustable pole piece 9 is secured to the opposite end of the bar magnet 6 to that which carries the core 2.

The sphere 1, the post (core) 2, the bar magnet 6, the cranked arm 7, the adjustable pole piece 9 and finally, an air gap 11 between the end 12 of the pole piece 9 and the sphere 1, together constitute a magnetic circuit. When the sphere 1 is resting, as shown, on the posts 2, 3 and 4 (which, of course, constitute the "support" of the accelerometer) and the accelerometer is undisturbed, the flux in the magnetic circuit is substantially constant. As a result, the number of flux linkages with the turns of the solenoid is also substantially constant and, effectively, no potential difference appears across the terminal leads 13, 14 or the coil 5.

Whenever the arrangement shown in FIG. 1 is subjected to an acceleration in, say, a plane which contains the upper ends of the posts 2, 3 and 4, which is greater than the threshold value of acceleration of the accelerometer, the sphere 1 will be disturbed and will either turn about any two of the posts or one of them. If it turns about posts 3 and 4 a space will appear between the top of post 2 and the sphere 1, the flux density in the magnetic circuit will change as will the flux linkages with the turns of the solenoid 5 and a potential difference will appear across the terminal leads 13 and 14 of the solenoid.

The net change in the magnetic flux in the circuit is due to the appearance of the air gap between the post 2 and the sphere and also to the contraction of the air gap 11. If, now, as a result of the acceleration the sphere 1 turns about posts 2 and 3 or 2 and 4, no air gap will appear between post 2 and the sphere, but the air gap 11 will again change.

In this case there is an increase in the flux whereas in the former case, at least for relatively small values of the gap which appears between the post 2 and the sphere, the flux decreased.

The sphere 1, of course normally returns to its original position after a short interval so that the signal appearing at terminals 13, 14 when the sphere moves away from post 2 will be a voltage excursion of a certain polarity rising to a maximum and returning to zero (generally followed by a short series of similar but diminishing excursions as the sphere bounces on the post 2). For movements away from posts 3 and 4, however, the voltage excursion will be of opposite polarity and smaller than before. This provides a simple way of discriminating between an acceleration in the plane of the basepiece 8, say, which will cause the sphere to move away from post 2 and others in the same plane.

The sensitivity of the device will depend upon the mass of the sphere 1 and its diameter in relation to the separation of the posts 2, 3 and 4. A heavy sphere will have larger inertia and will consequently require larger forces to move it away from one of the posts and vice versa. Other things being equal, therefore, replacement of the sphere by a lighter one will lead to an increase in sensitivity. Similarly, an increase in sensitivity is obtained, if, for a given separation of the posts, the sphere is replaced by one of larger diameter which rides higher between the posts. Yet again, the same effect occurs if the posts are moved closer together so as to make the sphere ride higher between them. Indeed, it is advantageous for posts 3 and 4 to be moveable along suitable positioned slots so that the separations of the posts from each other may be adjusted for the purpose of setting the sensitivity of the accelerometer.

If the posts are moved in relation to each other for the above purpose, then the sphere will rise and fall so that the space between the top part 15 of the cranked arm 7 will change. The same thing will happen if the sphere 1 is replaced by another of different diameter (as is indicated by the circles with broken lines in the figure). It is for the purpose of accommodating the resulting changes in the 'height' of the top of the sphere that the adjustable pole piece 9 is provided. The pole piece screws into and out of the threaded hole in arm 15 and is provided with a lock-nut 10 so that it may be clamped in a desired position and it permits the user to adjust the air gap 11 to a desired value. If the accelerometer is designed for use with a sphere of one particular size and with the posts 2, 3 and 4 at one particular spacing, then the adjustable pole piece 9 may be dispensed with and the lower surface of part 15 of arm 7 may be arranged to be separated by a suitable distance from the top of sphere 1.

The device illustrated in FIG. 1 may be protected by being housed within a sealed container. This may, additionally, contain a damping liquid which will discourage the sphere, after displacement, from returning too quickly to its rest position and from bouncing after its return to that position. This will then permit more accurate measurements of the period of displacement to be made when the user is interested in determining the magnitude of the acceleration.

Figure 2:
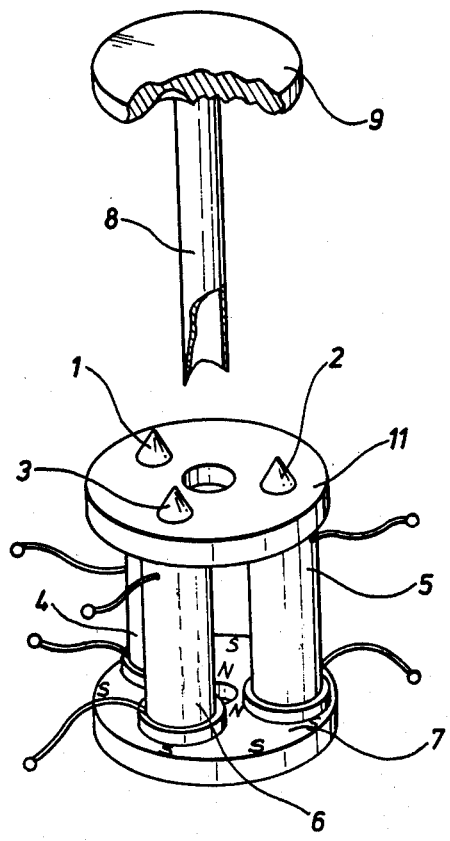
FIG. 2 is a part-exploded view of a further embodiment of the invention.
Figure 2:
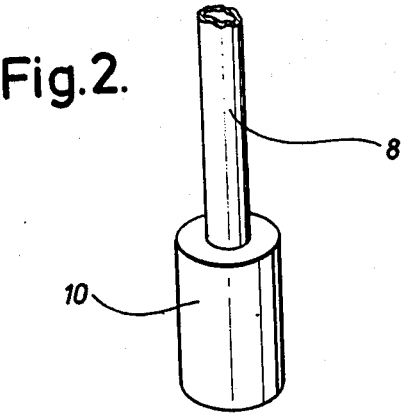

In FIG. 2 is shown another embodiment of the invention which is especially sensitive to small accelerations, or at least can be made so.

In this embodiment, the accelerometer has an annular permanent magnet 7 to which are secured at roughly 120° intervals, cylindrical iron cores which terminate in conical or frusto-conical pole-pieces 1, 2 and 3. The cores are located within solenoids 4, 5 and 6, and at their upper ends, pass through and are held in position in relation to each other by a non-magnetic annular member 11. Finally, a disc 9 of iron or other magnetic material to the centre of which is secured a rod or hollow tube 8 of the same material, rests on the pole pieces 1, 2 and 3 with the member 8 passing downwards through the holes in the member 11 and magnet 7 which are roughly in alignment with each other.

The diameters of the holes in magnet 7 and member 11 and the diameter of rod member 8 are such that member 8 is free to move laterally within the holes to permit the disc 9 to tilt about the pole pieces 1, 2 and 3.

When the accelerometer is arranged as described and is undisturbed, the flux linkages with the three solenoids or "pick-up" coils 4, 5 and 6 remain substantially constant and effective no potential difference appears across the terminal leads of the coils. Each of the cores within the solenoids forms part of a separate magnetic circuit which is completed by a radial part of magnet 7, by the air gap between the inner face of magnet 7 and member 8, by member 8 itself and by a radial part of the disc 9.

When the accelerometer is subjected to an acceleration, in the plane, say, of the ends 1, 2, 3 of the cores (which ends, or pole pieces, of course, constitute the "support" of the accelerometer) the disc 9 will turn about two (or in extreme cases, one) of the pole pieces. As a result, an air gap will appear between the disc 9 and one (or two) of the pole pieces and, in addition, the air gap between the member 8 and the inner surface of the magnet 7 of the corresponding magnetic circuit will be reduced. The net effect will then be that the reluctance of the magnetic circuit will be increased and the magnetic flux in the circuit and the number of flux linkages with the solenoid of the circuit, reduced. Similarly, because the air gaps between the magnet 7 and the member 8 of the other two magnets will be slightly increased, the flux linkages with the corresponding solenoids will be slightly reduced. The reductions in flux linkages, and hence the voltages developed across the terminals of the solenoids concerned will be much less than in the case of the magnetic circuit in which an additional air gap is introduced by the tilting of the disc 9. From a comparison of the voltages developed across the three coils, it is possible to determine the direction of tilt of the disc 9 and hence the direction of the acceleration.

In the accelerometer illustrated in FIG. 2, the member 8 is provided with a weight 10 whose position on the member may be adjusted at will. In this way it is possible to control the sensitivity of the device since, the higher the weight 10 on the member 8, the smaller the acceleration to which the accelerometer will respond.

As with the accelerometer of FIG. 1, the present device may be housed in a sealed container which may or may not contain a damping fluid. If a damping fluid is provided, it will be for the purpose of extending the periods of disturbance of the body which is normally in a condition of stable equilibrium (in this case, the disc 9) and also for reducing "bounce" as with the device illustrated in FIG. 1, to assist in the determination of the magnitude of the acceleration causing the disturbance.

What is claimed is:

1. An accelerometer including at least one body, a plurality of support members for supporting the body in a state of stable equilibrium except when the accelerometer is subjected to an acceleration exceeding a threshold value wherein movement of the body relative to the support members causes a change in a physical parameter of the accelerometer and wherein a first supporting member and the body are made from magnetic materials and the remaining supporting members are made from non-magnetic materials, the first supporting member having an exterior which passes through and forms a core for a solenoid, a magnetic or magnetisable element attached to the core at a position remote from the body, the element having a pole piece which terminates at a surface confronting the body across a spacial gap, such that the body, the first supporting member, and its extension, the magnetic/magnetisable element, the pole piece and the spacial gap constitute a magnetic circuit having a substantially constant flux when the body is supported on the support members and when the solenoid is energised, the flux changing when the accelerometer is subjected to an acceleration which dislodges the body from the supports to change the extent of the spacial gap and produce a further spacial gap between the body and the first supporting member.

2. An accelerometer according to claim 1 wherein there are three supporting members disposed at the corners of an equilateral triangle and wherein that part of the body which contacts the supporting member is hemi-spherical.

3. An accelerometer including at least one body, a plurality of supports for supporting the body in a state of stable equilibrium except when the accelerometer is subjected to an acceleration exceeding a threshold value wherein movement of the body relative to the supports causes a change in a physical parameter of the accelerometer and wherein the body is of generally mushroom shape having a head and a stem and the accelerator also comprises an annular parmanent magnetic element or an annular permanent magnetisable element, three substantially parallel and equally spaced core members carried by the said element and each having an associated solenoid, one end of each core constituting one of said supports for the body so that when at rest, the stem is located in a space within the solenoids and passes with clearance through the said annular element, the head is supported on the three supports constituted by the ends of the cores, and undisturbed flux linkages exist in magnetic circuits between the individual solenoids or portions of the said annular element a spacial gap between the annular element and the stem, the head and the appropriate core, the flux changing when the accelerometer is subjected to an acceleration which dislodges the head from at least one support to establish a space therebetween.

4. An accelerometer according to claim 3 including a weight carried by the stem at a position remote from the support.

5. An accelerometer according to claim 4, wherein the position of the weight is adjustable along the length of the stem.

* * * * *